Sept. 13, 1932.  G. LOVELL ET AL  1,877,336
PANEL FOR THE WALLS AND DOORS OF REFRIGERATORS AND COLD STORAGE ROOMS
Filed May 1, 1931
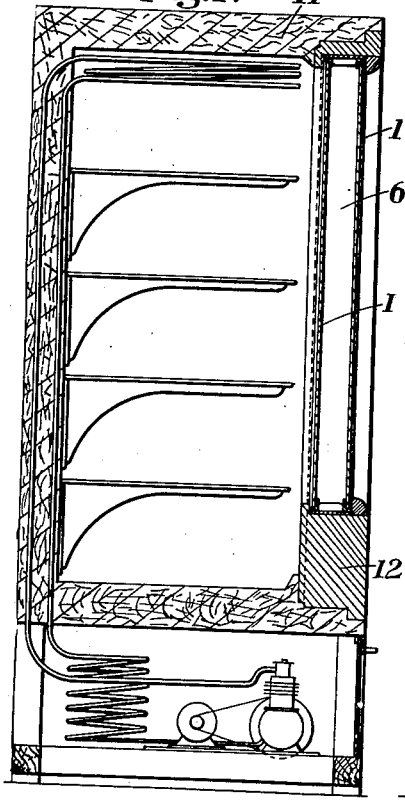
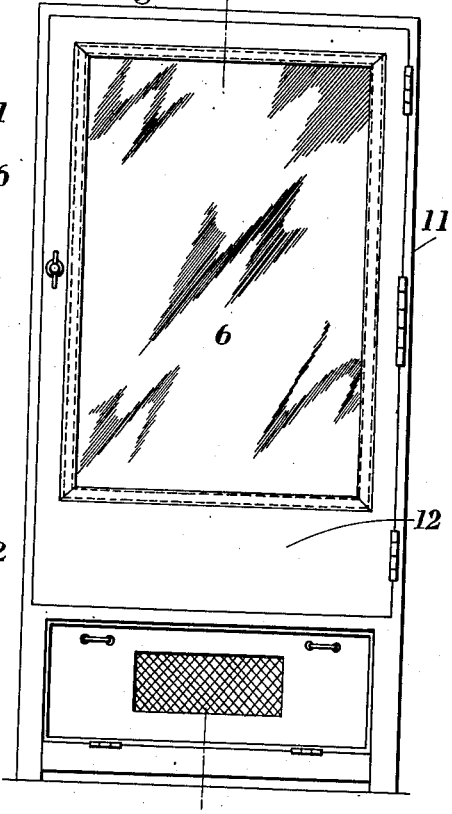
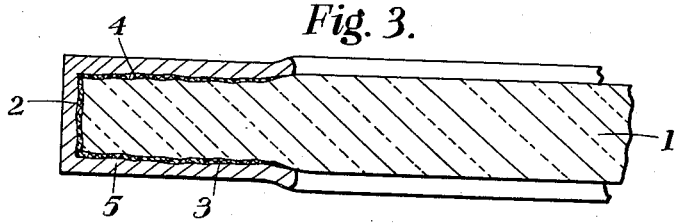
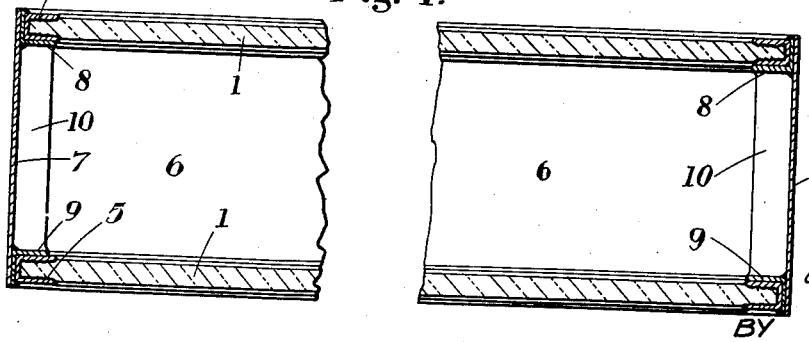
INVENTORS
George Lovell
George Digby Lovell
BY
S. Sokal
ATTORNEY Patented Sept. 13, 1932

1,877,336

UNITED STATES PATENT OFFICE

GEORGE LOVELL AND GEORGE DIGBY LOVELL, OF STRATFORD, LONDON, ENGLAND

PANEL FOR THE WALLS AND DOORS OF REFRIGERATORS AND COLD STORAGE ROOMS

Application filed May 1, 1931, Serial No. 534,268, and in Great Britain December 18, 1930.

The present invention relates to panels for the walls and doors of refrigerators and cold storage rooms, and more particularly to a heat-insulating transparent double-walled panel for the latter. Panels of this kind generally comprise a metal frame and inner and outer glass plates with an intervening space which is provided for the purpose of reducing or preventing transmission of heat. It has been found in practice that it is extremely difficult to obtain an absolutely airtight joint between the glass plates and the frame, particularly between the inner plate and the frame. This is probably due in most cases to the fact that the packing materials used for packing or sealing the joint between the plate and the metal frame, such as putty or rubber or cement, deteriorate under the action of the very low temperature in the refrigerator and become, after a certain time, ineffective. The result is that moisture enters the space between the two plates and is deposited in the form of frost upon the inner faces of the plates, thus rendering the plates more or less non-transparent. This is a very great drawback as the object of these transparent doors or walls is to make the contents of the refrigerator clearly visible to the public or the user. It is, of course, impossible to remove the frost from the inner surfaces of these plates once the airtight jont has been destroyed, as the inner space between the plates is not accessible.

According to the invention the hitherto used packing materials and cements employed for sealing the joint between the glass and the frame are dispensed with and an hermetically tight joint is obtained by providing each glass plate with an air-tightly adherent metal rim having molecular connection therewith and by uniting this metal rim air-tightly with the metal frame by means of a suitable solder.

A suitable method of providing the plates with a metal rim is, for instance, the following:—

The glass plate, which is usually of polished glass, is first sand-blasted upon its edge portions, preferably upon the edge portion itself and the adjacent strips of the inner and the outer surfaces. These sand-blasted portions are then rendered conductive, for instance, by silvering or by covering with graphite, and are finally provided with an electrolytically deposited metal coating, for instance, copper. This electro-deposited layer may be of any suitable thickness, say three sixty-fourths of an inch. The plate is then inserted into the metal frame which is preferably provided with a channelled portion adapted to receive the metal rim of the glass plate. The joint between the channelled portion of the metal frame and the metal rim of the glass plate is then sealed by soldering.

It will be understood that more than two glass plates may be used with intervening air or gas spaces between adjacent plates. The plates may all be fixed to the frame in the same manner. The air contained in the intervening space or spaces may be exhausted or left at ordinary pressure, or a gas may be used to displace the air. The gas or air may be dried by means of containers holding a desiccating substance and the intervening space or spaces may afterwards be sealed off hermetically. Any suitable metal may be used for providing the metal rim upon the glass plate. Other methods of making the rim may be used, for instance, a suitable flux may be interposed between the plate and a thin metal frame which is to constitute the metal rim, and the flux may then be melted. In practice, however, it has been found that the rim is best produced by electro-deposition.

The accompanying drawing shows by way of example the application of the invention to a double-walled panel of a refrigerator.

Fig. 1 shows in sectional elevation a refrigerator provided with a double-walled panel made according to the invention.

Fig. 2 is a front elevation of the refrigerator,

Fig. 3 is a partial section through a glass plate provided with a metal rim produced by electro-deposition, Fig. 4 is a section through a double-walled panel.

Referring first to Figs. 3 and 4, 1 represents a polished glass plate the edge portions of which have been sandblasted at 2, 3 and 4 and rendered conductive by silvering or by covering with graphite. 5 indicates a metal rim produced by electro-deposition and covering edge portions 2, 3 and 4. For the sake of clearness the thickness of the rim is shown considerably larger than its real size. 6 indicates a metal frame which comprises an outer member 7 made of sheet metal and two side members 8 and 9 made of channel iron. 10 indicates transverse staying members. It will be understood that the side frames 8, 9 are connected to the outer frame 7 in an airtight manner or they may be made integral therewith. In each of the channelled side frames 8 and 9 is inserted a glass plate 1 having a metal rim 5 and is fixed to the side frame in an airtight manner by soldering.

Figs. 1 and 2 show a refrigerator 11 of usual construction having a hinged door 12 provided with a double-walled panel 6.

We claim:

1. A heat insulating transparent double-walled panel for the walls and doors of refrigerators and cold storage rooms, comprising in combination: two glass plates; air-tightly adherent metal rims on each of said glass plates; a metal frame into which said metal rims are inserted; and soldered joints uniting said metal rims air-tightly with said metal frame, substantially as described.

2. A heat insulating transparent double-walled panel for the walls and doors of refrigerators and cold storage rooms, comprising in combination: two glass plates; air-tightly adherent electrolytically deposited metal rims on each of said glass plates; a metal frame; members on said frame into which said metal rims are inserted and which enclose the latter separately and individually; and soldered joints uniting said metal rims individually with said members on said frame, substantially as described.

3. A heat insulating transparent double-walled panel for the walls and doors of refrigerators and cold storage rooms, comprising in combination: two glass plates having their edge portions and strips of their inner and outer surfaces adjacent thereto roughened by sand blasting; air-tightly adherent metal rims on each of said plates produced by metallising the edge portions and adjacent strips and then forming an electrolytic deposit thereon; a metal frame; channel members on said frame into which said metal rims are inserted so that the latter are individually enclosed by said members whereby said plates are held in said metal frame at a spaced distance apart; and soldered joints rigidly and air-tightly connecting said rims with said channel members, substantially as described.

Signed at 9, Bishopsgate in the city of London, England, this twentieth day of April, 1931.

GEORGE LOVELL.
GEORGE DIGBY LOVELL.